(12) United States Patent
Kim

(10) Patent No.: US 7,560,178 B2
(45) Date of Patent: Jul. 14, 2009

(54) AQUEOUS INORGANIC EXPANDABLE REFRACTORY COMPOSITION AND REFRACTORY BOARD COMPRISING THE SAME

(76) Inventor: Ju Hyun Kim, Byuk-san Apt. 107-2004, Geumho-dong 633, Seongdong-gu, Seoul 133-778 (KR)

( * ) Notice: Subject to any disclaimer, the term of this patent is extended or adjusted under 35 U.S.C. 154(b) by 162 days.

(21) Appl. No.: 11/653,154

(22) Filed: Jan. 12, 2007

(65) Prior Publication Data
US 2007/0160765 A1 Jul. 12, 2007

(30) Foreign Application Priority Data
Jan. 12, 2006 (KR) .................... 10-2006-0003479

(51) Int. Cl.
C09D 5/18 (2006.01)
B05D 3/02 (2006.01)
C09D 5/16 (2006.01)
(52) U.S. Cl. .................. 428/704; 428/701; 428/702; 427/387; 427/388.1; 427/397.1; 106/18.18; 106/18.12
(58) Field of Classification Search ............ 428/701, 428/702, 704; 427/387, 388.1, 397.1; 106/18.18, 106/18.12; C09D 5/18, 5/16; B05F 3/02
See application file for complete search history.

(56) References Cited

U.S. PATENT DOCUMENTS 4,670,101 A * 6/1987 Schmidt et al. ............ 162/152

FOREIGN PATENT DOCUMENTS

| KR | 10-528391 | 10/2004 |
|----|-----------|---------|
| KR | 10-520814 | 10/2005 |

\* cited by examiner

*Primary Examiner*—John J. Zimmerman
*Assistant Examiner*—Aaron Austin
(74) *Attorney, Agent, or Firm*—D. Peter Hochberg; Sean F. Mellino; Daniel J. Smola

(57) ABSTRACT

Disclosed is an aqueous inorganic expandable refractory composition comprising: 1-3 wt % of a phosphorus-based flame retardant containing a carboxylic acid derivative; 15-20 wt % of a first metal oxide; 48-65 wt % of a second metal oxide containing silicon dioxide; 10-20 wt % of an aluminum hydroxide silicate mineral having a layered structure; and the balance of water. When the composition is heated, closed pores are formed in the composition due to carbon dioxide resulting from the thermal self-decomposition of the phosphorus-based flame retardant. Also, disclosed is a refractory board formed using the composition. Just after the refractory board is heated, the surface thereof is expanded while the thermal stability thereof is increased to suppress the burning thereof. Also, the back surface opposite the heated surface of the refractory board is not influenced by the heating condition of the heated surface, and thus shows no change in the temperature and shape thereof. Accordingly, the composition can be applied to not only inflammable materials such as natural fiber, synthetic fiber, paper and wood, but also iron materials.

6 Claims, 7 Drawing Sheets
(7 of 7 Drawing Sheet(s) Filed in Color)

| 5 min | 30 min | 120 min |
|---|---|---|
|  |  |  |
| Smoke occurred and expansion started | No longer expanded | Crack occurred in expanded layer |

| 180 min | Removal of fire source | Burnt layer |
|---|---|---|
|  |  |  |
| Crack became larger | Second layer was burnt (5 mm of total thickness of 7.5 mm was burnt); temperature and shape of back surface were not changed. | Burnt refractory board layer was removed; honeycomb shape was maintained. |

AQUEOUS INORGANIC EXPANDABLE REFRACTORY COMPOSITION AND REFRACTORY BOARD COMPRISING THE SAME

CROSS-REFERENCE TO RELATED APPLICATION

This application claims foreign priority based on Korean Patent Application Serial No. 2006-3479 filed Jan. 12, 2006, the content of which is incorporated herein by reference in its entirety.

FIELD OF THE INVENTION

The present invention relates to an aqueous inorganic expandable refractory composition comprising: a phosphorus-based flame retardant containing a carboxylic acid derivative; a first metal oxide; a second metal oxide containing silicon dioxide; an aluminum hydroxide silicate mineral having a highly expandable layered structure; and water, and to a refractory board and a fireproof paint comprising the same.

BACKGROUND TO THE INVENTION

Fireproof building structures have a low risk of catching fire, and even after they catch fire, the main structural parts thereof, for example, walls, posts and crossbeams, will not show a decrease in strength, and thus the building structures that caught fire can be reused after simple repair. For this reason, the Enforcement Decree of the Korean Building Act provides the standards of fireproof structures for each of the main structural parts of buildings, for example, walls, posts, bottoms, crossbeams, roofs and stairs.

However, due to the rapid development of new building materials, advanced countries discard the way of providing the specific standards of fireproof structures for each part of the structures, and adopt the way of determining the performance of each structural part, which can resist fire for a specific time. In the case of Japan, for example, the Enforcement Decree of the Building Act includes the same contents as those of the Enforcement Decree of the Korean Building Act, but currently provides that the main structural parts of a building can resist fire for 30 minutes to 3 hours depending on the position of the building, such as the number of layer of the building.

As cores for fire doors or various building structures, materials having honeycomb or urethane foam inserted therein, or materials comprising glass fiber or rock wool, have been used. However, such materials are harmful for the human body and have low insulation properties, and thus do not sufficiently satisfy refractory standards that gradually tighten.

As another example, there is a case in which a fire door is manufactured using, as a single core, urethane, polyimide or polystyrene foam resin, which contain an inorganic additive such as a flame retardant. However, these core materials, when caught fire, have low ignition point, leading to low flame-blocking and insulation effects, and generate poisonous gas, thus causing human loss.

Korean Patent Registration No. 528391 (Publication No. KR 10-528391) discloses a material for use as cores for fire doors or as internal/external materials or cores for various building structures, which is prepared by melting and spinning basalt to make basalt fiber, mixing the basalt fiber as a main component with bentonite, soda-silicate, and polyvinyl acetate emulsion at a specific ratio, and moulding the mixture in the form of a panel or sheet. According to the disclosure of said patent, the material is harmless for the human body, does not generate dust during operations, has excellent heat resistance and insulation properties, generates a reduced amount of poisonous gas when caught fire, emits a large amount of far-infrared rays, and has good sound-absorbing properties.

Also, calcined bauxite has been used as one of main raw materials in the refractory material industry. Ghana produced most of the worldwide demand of bauxite up to the late 1970s, and Refractory A-grade super calcined bauxite commercially available from Linden Corp. was acknowledged as an industrial standard. Currently, China dominates the refractory bauxite market and supplies 70% of the worldwide demand of bauxite. Such calcined bauxite has an alumina ($Al_2O_3$) content of more than 90%.

The present inventors have made efforts to develop a refractory, which minimizes the harmful effects of the prior refractory materials and, at the same time, has excellent refractory properties. As a result, the present inventors have found that, an aqueous flame-retardant composition obtained by adding an aluminum hydroxide silicate mineral, having a highly expandable layered structure, to an inorganic flame retardant consisting of a phosphorus-based flame retardant, a first metal oxide and a second metal oxide containing silicon dioxide, and the balance of water [see Korean Patent Registration No. 520814 (Publication No. KR 10-520814)], shows excellent refractory properties by forming closed pores and blocking oxygen due to gas resulting from the thermal self-decomposition of the phosphorus-based flame retardant and, at the same time, maintains the properties of the aqueous flame-retardant composition. Also, we have found that a refractory board formed using this inorganic expandable refractory composition will have excellent refractory properties, thereby completing the present invention.

SUMMARY OF THE INVENTION

It is an object of the present invention to provide an aqueous inorganic refractory composition, which is not poisonous and, at the same time, shows excellent refractory properties.

Another object of the present invention is to provide an aqueous inorganic expandable refractory composition, which, when heated, forms a carbonaceous layer due to expandability to block oxygen, thus exhibiting excellent refractory properties.

Still object of the present invention is to provide a refractory board formed using said aqueous inorganic expandable refractory composition.

Still another object of the present invention is to provide a fireproof paint formed using said aqueous inorganic expandable refractory composition.

To achieve the above objects, according to one aspect, the present invention provides an aqueous inorganic expandable refractory composition comprising: 1-3 wt % of a phosphorus-based flame retardant containing a carboxylic acid derivative represented by Formula 1; 15-20 wt % of a first metal oxide; 48-65 wt % of a second metal oxide containing silicon dioxide; 10-20 wt % of an aluminum hydroxide silicate mineral having a layered structure; and the balance of water:

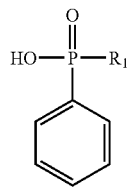

[Formula 1]

wherein $R_1$ represents —$CH_2COOH$, —$CH_2CH_2COOH$ or —COOH.

In the above refractory composition according to the present invention, the aluminum hydroxide silicate mineral consists of 62.0-68.0 wt % of $SiO_2$, 18.0-23.0 wt % of $Al_2O_3$, 1.3-2.5 wt % of $Fe_2O_3$, 0.1-1.9 wt % of MgO, 0.05-1.5 wt % of $Na_2O$, 5.0-8.0 wt % of $K_2O$, and the balance of at least one element selected from the group consisting of S, P, Pb, As and Hg.

Preferably, the aluminum hydroxide silicate mineral has a particle size of 0.001-0.005 mm.

According to another aspect, the present invention provides a refractory board which is formed by impregnating or applying said aqueous inorganic expandable refractory composition, into or to one or both sides of either any one inflammable material selected from the group consisting of natural fiber, synthetic fiber, paper and wood, or a substrate selected from iron materials, and then drying the impregnated or applied composition.

Preferably, the refractory composition is applied to a thickness of 0.3-1.5 mm.

Furthermore, the present invention provides a fireproof paint which is formed by being mixed with pigments and the aqueous inorganic expandable refractory composition.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other objects, features and advantages of the present invention will be more clearly understood from the following detailed description taken in conjunction with the accompanying drawings, in which.

DETAILED DESCRIPTION OF THE PREFERRED EMBODIMENT

Figure 1:
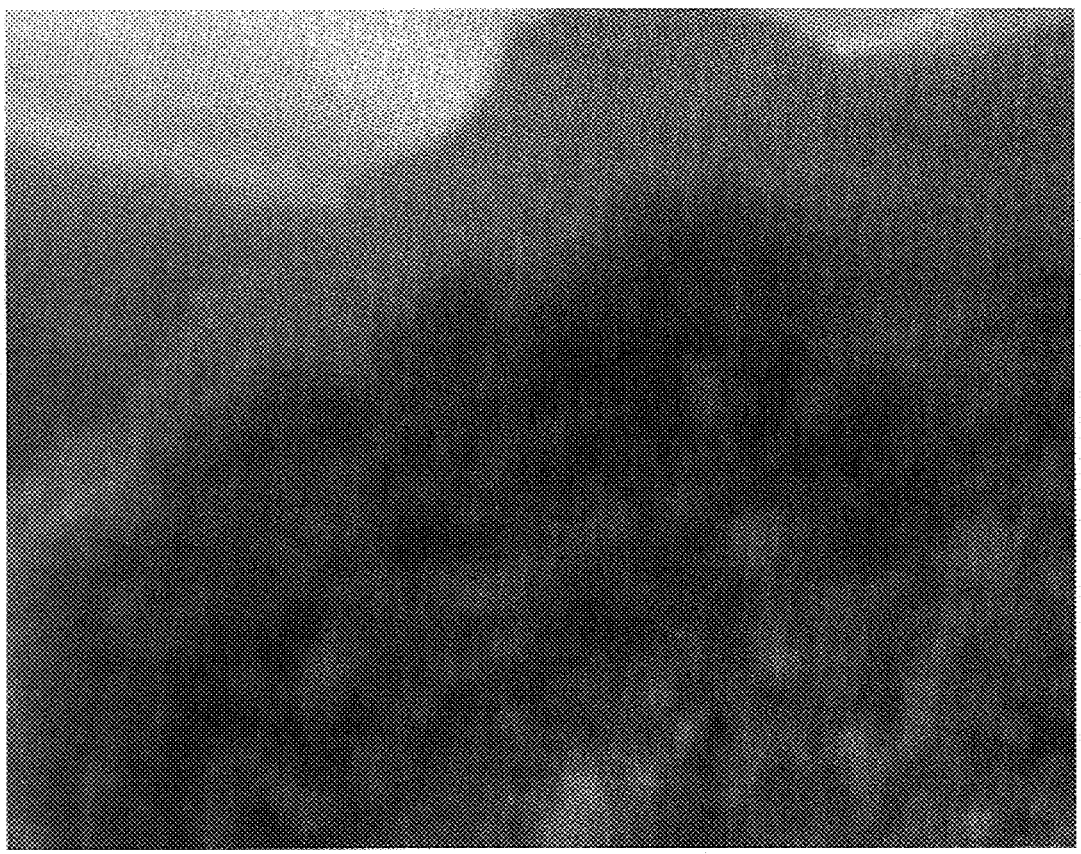
FIGS. 1 and 2 are photographs showing the surface of an aluminum sheet attached with a fiber sludge treated with an aqueous inorganic expandable refractory composition of the present invention, before and after the fiber sludge was burnt, respectively.

Hereinafter, the present invention will be described in further detail.

The present invention provides an aqueous inorganic expandable refractory composition comprising: 1-3 wt % of a phosphorus-based flame retardant containing a carboxylic acid derivative represented by Formula 1; 15-20 wt % of a first metal oxide; 48-65 wt % of a second metal oxide containing silicon dioxide; 10-20 wt % of an aluminum hydroxide silicate mineral having a layered structure; and the balance of water:

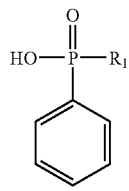

[Formula 1]

wherein $R_1$ represents —$CH_2COOH$, —$CH_2CH_2COOH$ or —COOH.

The aqueous inorganic expandable refractory composition of the present invention contains the layered aluminum hydroxide silicate mineral in addition to the known aqueous flame-retardant composition (Korean Patent Registration No. 520814 (Publication No. KR 10-520814)). Thus, the inventive refractory composition can increase the flame-retardant effect of the phosphorus-based flame retardant while it maintains the properties of the aqueous flame-retardant composition.

Specifically, with respect to the flame retardant mechanism of the phosphorus-based flame retardant containing the carboxylic acid derivative represented by Formula 1, the phosphorus compound is thermally decomposed during burning, and byproducts resulting from the thermal decomposition of the phosphorus compound react with polymer resin to form a carbonaceous layer on the surface of the resin, so as to block oxygen required for burning, thus exhibiting flame-retardant effects. In particular, the phosphorus compound is dehydrated by reaction with the oxygen atom of the polymer resin to exhibit flame-retardant effects, and thus performs an effective flame-retardant role in polymers containing oxygen atoms.

For this purpose, the aqueous inorganic expandable refractory composition of the present invention comprises 1-3 wt % of the phosphorus-based flame retardant containing the carboxylic acid derivative; 15-20 wt % of the first metal oxide; 48-65 wt % of the second metal oxide containing silicon dioxide; 10-20 wt % of the aluminum hydroxide silicate mineral having the layered structure; and the balance of water. When the aqueous inorganic expandable refractory composition of the present invention is heated, the surface of glassy particles, including the first metal oxide containing oxygen particles, the second metal oxide containing silicon dioxide, and the aluminum hydroxide silicate mineral having the layered structure, will be melted or softened, the viscous flow thereof will surround the phosphorus-based flame retardant containing the carboxylic acid derivative, and the phosphorus-based flame retardant surrounded by the glassy particles will be thermally self-decomposed to generate carbon dioxide ($CO_2$) gas. When this state is stabilized, closed pores will be formed in the solid glassy material, so that independent bubbles will be present the closed pores, whereby a refractory material having an expansion capability of at least 500 times will be formed.

Thus, the phosphorus-based flame retardant containing the carboxylic acid derivative according to the present invention is preferably used in an amount of 1-3 wt % based on the total weight of the composition. If the phosphorus-based flame retardant is used in an amount of less than 1 wt %, it cannot provide the desired flame-retardant effect, and if it is used in an amount of more than 3 wt %, it will not miscible with the other components of the composition.

The first metal oxide and the second metal oxide containing silicon dioxide, which are used in the present invention, are inorganic flame retardants. As the first metal oxide or the second metal oxide, it is preferable to use at least one selected from the group consisting of sodium oxide, magnesium oxide, calcium oxide, aluminum oxide, barium oxide and zinc oxide.

More preferably, the first metal oxide is in the form of a mixture of sodium oxide, magnesium oxide and calcium oxide. The first metal oxide is preferably used in an amount of 15-20 wt % based on the total weight of the composition. If the content of the first metal oxide in the composition deviates from this range, it cannot sufficiently surround the phosphorus-containing carboxylic acid derivative as an organic flame retardant, so that the desired synthesis cannot be achieved. If the first metal oxide consists of said mixture of sodium oxide, magnesium oxide and calcium oxide, it will consist of, based on the total weight of the composition, 7-8 wt % of sodium oxide, 5-7 wt % of magnesium oxide and 3-5 wt % of calcium oxide.

Also, the second metal oxide containing silicon dioxide is preferably a mixture of silicon dioxide and aluminum oxide, and in this case, it is preferably used in an amount of 48-65 wt % based on the total weight of the composition. If the second metal oxide consisting of the mixture of silicon dioxide and aluminum oxide is used in an amount deviating from the above-specified range, the formation of an oxide film will be incomplete, leading to a reduction in flame-retardant effects. If the second metal oxide is a mixture of silicon dioxide and aluminum oxide, it will consist of, based on the total weight of the composition, 26-30 wt % of silicon dioxide and 22-35 wt % of aluminum oxide.

The inventive inorganic flame retardant consisting of metal oxides, when caught fire, produces water, which is then changed to water vapor and, at the same time, dilutes combustible gas and lowers the temperature around the burning site, thus suppressing burning phenomena. Thus, the flame-retardant mechanism of the inorganic flame retardant is attributable to crystal water chemically bound to metal atoms, and such crystal water is stable at most of plastic processing temperatures and is not released even in a long-term heating condition. Also, because the composition according to the present invention contains the inorganic flame retardant consisting of the first metal oxide and the second metal oxide, which are easily available and thus are inexpensive, it is non-toxic, generates a reduced amount of smoke, resulting in reduced corrosion of processing machines, and has excellent electrical insulation properties.

As the layered aluminum hydroxide silicate mineral, which is used in the aqueous inorganic expandable refractory composition of the present invention, it is preferable to use a mineral that is easily available, is inexpensive and, at the same time, has high expansion rate. More preferably, the aluminum hydroxide silicate mineral consists of 62.0-68.0 wt % of $SiO_2$, 18.0-23.0 wt % of $Al_2O_3$, 1.3-2.5 wt % of $Fe_2O_3$, 0.1-1.9 wt % of MgO, 0.05-1.5 wt % of $Na_2O$, 5.0-8.0 wt % of $K_2O$, and the balance of at least one element selected from the group consisting of S, P, Pb, As and Hg.

The aluminum hydroxide silicate mineral having the layered structure is preferably used in an amount of 10-20 wt % based on the total weight of the composition. If it is used in an amount of less than 10 wt %, the composition will have reduced impact resistance and thermal stability, and if it is used in an amount of more than 20 wt %, it will increase the expansion coefficient to cause cracks in an expanded layer, leading to dimensional instability.

Also, the aluminum hydroxide silicate mineral preferably has a particle size of 0.001-0.005 mm, which does not influence the compatibility of the silicate mineral with other components constituting the aqueous inorganic expandable refractory composition of the present invention.

According to another aspect, the present invention provides a refractory board which is formed by impregnating or applying said aqueous inorganic expandable refractory composition, into or to one or both sides of either any one inflammable material selected from the group consisting of natural fiber, synthetic fiber, paper and wood, or a substrate selected from iron materials, and then drying the impregnated or applied composition. Herein, the drying step is carried out at room temperature for 20-60 minutes, and more preferably at room temperature for 20-30 minutes.

The refractory board according to the present invention can be stacked in at least two layers to form a refractory panel. Alternatively, to prevent a fire source from penetrating into gap, the refractory board can also be arranged in a lattice shape.

The refractory composition is applied to a thickness of 0.3-1.5 mm. If the thickness is less than 0.3 mm, the refractory composition will not exhibit a sufficient refractory function, and if it is more than 1.5 mm, it will cause dimensional instability due to excessive weight.

Just after one surface of the refractory board comprising the aqueous inorganic expandable refractory composition according to the present invention is heated, the surface is expanded, so that the burning thereof is suppressed and the transfer of heat to a material to be protected from a flame is blocked or delayed. Also, even if the refractory board is partially burnt, the shape of the core thereof can be maintained. In particular, the back surface opposite to the heated surface of the refractory board is not by the heating condition of the heated surface, and thus there is no change in the temperature and shape of the back surface.

Also, because the aqueous inorganic expandable refractory composition contains no halogen, it generates a reduced amount of hazardous gas when heated. In addition, because it contains no harmful heavy metals such as lead, cadmium, mercury and chromium (VI), it can be used to produce eco-friendly products.

The method of applying the aqueous inorganic expandable refractory composition to the substrate surface is not specifically limited. For example, it is possible to use a method selected from among a coating method, a spray method and an impregnation method.

The present invention provides a fireproof paint which is formed by being mixed with pigments and the aqueous inorganic expandable refractory composition.

Hereinafter, the present invention will be described in detail with reference to examples. It is to be understood, however, that these examples are illustrative only and the scope of the present invention is not limited thereto.

EXAMPLE 1

Preparation of Aqueous Inorganic Expandable Refractory Composition

Step 1: Synthesis of Phosphorus-Containing Carboxylic Acid Derivative 450 g of 98% pure phenylphosphonic acid and 550 g of 98% pure acetic acid were placed into a three-neck flask, in which they were allowed to react with stirring at room temperature for 15 minutes. After completion of the reaction, the reaction solution was cooled, and the formed precipitate was filtered with water in a vacuum. The filtrate was dried to remove water, affording the desired compound (yield: 60%).

Step 2: Reaction of Adding First and Second Metal Oxides 100 g of the phosphorus-containing carboxylic acid derivative prepared in the step 1 was added to 2.5 kg of water, and stirred at 60-80° C. until it was completely dissolved, thus preparing a first solution. 2 kg of a metal oxide mixture consisting of sodium oxide, magnesium oxide and magnesium oxide was added to the first solution and stirred for about 5-8 minutes, so that the metal oxide was completely in the first solution.

Meanwhile, 4.9 kg of a metal oxide mixture consisting of silicon dioxide and aluminum oxide was added to 0.5 kg of water, and stirred until it was completely dissolved in the water, thus preparing a second solution. The prepared second solution was mixed with the first solution, and the mixture solution was sufficiently stirred for 5-8 minutes, followed by water electrolysis.

Step 3: Reaction of Adding Aluminum Hydroxide Silicate Mineral 1.5 kg of an aluminum hydroxide silicate mineral having a particle size of 0.002 mm was added to the aqueous solution of the step 2, and the mixture was stirred, thus preparing a completely dissolved solution.

Herein, the aluminum hydroxide silicate mineral consisted of 62.5 wt % of $SiO_2$, 21.7 wt % of $Al_2O_3$, 2.36 wt % of $Fe_2O_3$, 1.86 wt % of MgO, 1.41 wt % of $Na_2O$, 7.81 wt % of $K_2O$, and the balance of at least one element selected from the group consisting of S, P, Pb, As and Hg.

EXAMPLE 2

Manufacture of Refractory Board, and Refractory Test 1

The inorganic expandable refractory composition prepared in Example 1 was applied to one side of a flame retardant-treated polyester core having a size of 500×500 mm, to a thickness of 1.0 mm, and then dried at room temperature for 30 minutes, thus manufacturing a refractory board having the same size as above. Then, the refractory board was stacked on both sides of a polyester core to manufacture a refractory panel.

The refractory panel was directly heated to 800-1190° C. using a heat source spaced 10 cm apart from the panel, and changes in the temperature and shape of the heated surface and the back surface opposite to the heated surface were observed. The observation results are shown in Table 1 below.

TABLE 1

| Elapsed time (min) | Surface temperature (° C.) | Heated surface | Back surface temperature (° C.) | Back surface | Remarks |
| --- | --- | --- | --- | --- | --- |
| Start | 800 | | 22 | No change | |
| 5 min | 1000 | Surface swollen up due to expansion | 22 | No change | Heated surface started to expand; some white smoke occurred |
| 30 min | 1000 | Expansion ceased | 22 | No change | No longer changed after heated surface swollen up 3 cm. |
| 45 min | 1000 | No change | 22 | No change | |
| 60 min | 1100 | No change | 22 | No change | |
| 75 min | 1100 | No change | 22 | No change | |
| 90 min | 1150 | No change | 22 | No change | |
| 105 min | 1150 | No change | 22 | No change | |
| 120 min | 1190 | No change | 22 | No change | No change in expanded layer |

As shown in Table 1 above, in the surface temperature conditions of 800-1190° C., the heated surface showed an expansion phenomenon within 5 minutes after the start of heating, the shape of the heated surface was maintained even after the elapse of time without further change.

In particular, the back surface opposite to the heated surface was maintained at an initial temperature of 22° C. (room temperature) and did not undergo a change in the surface thereof.

EXAMPLE 3

Manufacture of Refractory Board, and Refractory Test 2

The inorganic expandable refractory composition prepared in Example 1 was applied on the surface of a substrate and dried, thus manufacturing a refractory board having a size of 500×500 mm and a thickness of 3 mm. 17 sheets of the refractory board were stacked on each other to manufacture a refractory panel.

One surface of the refractory panel was directly heated to 800-1190° C. using a heat source spaced 10 cm apart from the panel, and changes in the temperature and shape of the heated surface and the back surface opposite to the heated surface were observed. The observation results are shown in Table 2 below.

TABLE 2

| Time | State and temperature (° C.) of heated surface | State and temperature (° C.) of back surface | Remarks |
| --- | --- | --- | --- |
| 5 min | Heated surface started to expand, 800 | No change, room temperature | Smoke occurred (ceased after 4–6 min) |
| 30 min | 1000 | room temperature | No change |
| 60 min | 1000 | room temperature | No change |
| 90 min | 1100 | room temperature | Second layer started to burn |
| 120 min | 1190 | room temperature | Cracks occurred in expanded layer, and second layer was burnt |
| 180 min | 1190 | room temperature | Cracks occurred in second expanded layer |
| 240 min | 1190 | room temperature | Third layer was turned black, but was not broken. |

As shown in Table 2, in the case of the refractory panel formed only of the refractory boards manufactured using the inorganic expandable refractory composition of the present invention, the heated surface swollen up from 5 minutes after the start of heating and was partially burnt, but was no longer burnt. Particularly, it was observed that the temperature and shape of the back surface of the refractory panel were maintained constant before and after heating.

EXAMPLE 4

Manufacture of Refractory Board and Refractory Test 3

A portion of the surface of a PET pipe to be treated with the aqueous inorganic expandable composition prepared in Example 1 was applied with a bandage to a thickness of 3 mm. Then, the bandage was applied with the refractory composition to a thickness of 0.5 mm, dried, heated to 1190° C., and then observed for 10 min, 20 min and 30 min.

As a result, it was observed that, after 5 min of heating, the heated surface was expanded, did not burn, but generated some smoke, and was stained with black soot. After 20 min of heating, the heated surface was no longer changed. After 30 min of heating, the heated surface of the refractory structure or the pipe was no longer changed, but the internal part of the PET pipe was slightly melted.

EXAMPLE 5

Manufacture of Refractory Board, and Refractory Test 4

A fiber sludge treated with the aqueous inorganic expandable composition prepared in Example 1 was attached to a 2-mm-thick aluminum sheet and dried. Then, the fiber sludge was heated to 1190° C., and observed before and after burning.

Figure 2:
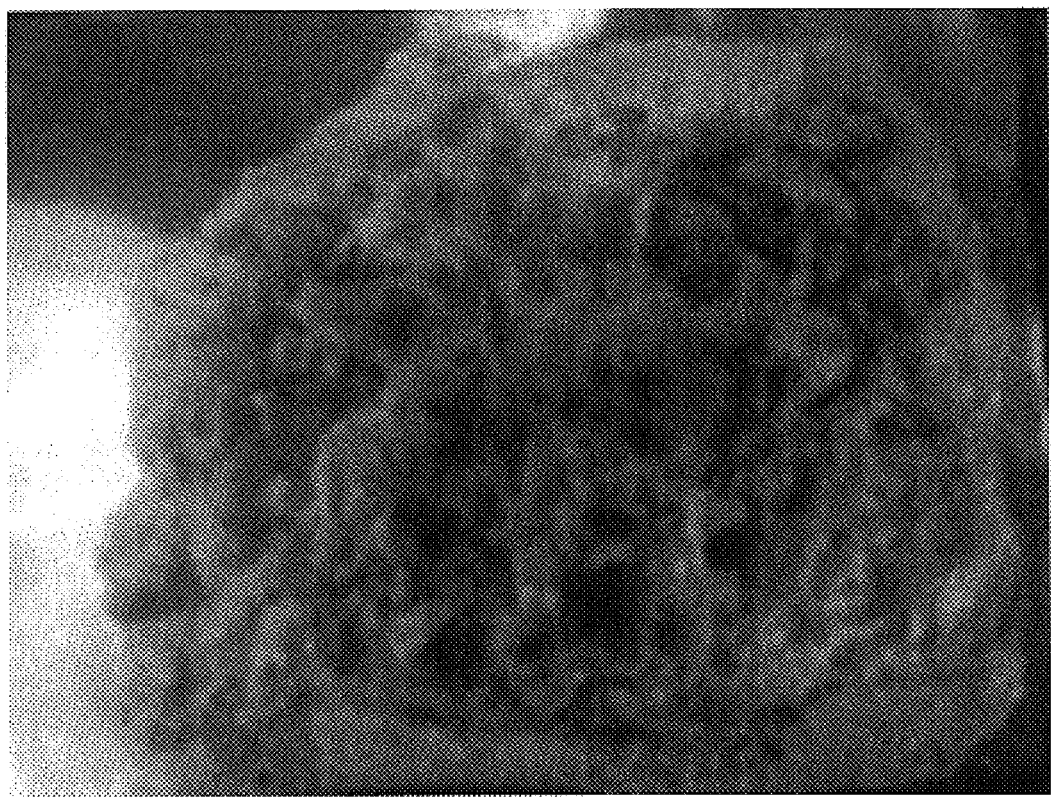

FIGS. 1 and 2 are photographs showing the surface of the aluminum sheet attached with the fiber sludge treated with the aqueous inorganic expandable refractory composition of the present invention, before and after the fiber sludge was burnt, respectively. As can be seen in FIGS. 1 and 2, the surface of the aluminum sheet was expanded while some burning and smoke occurred. Other changes could not be observed.

Figure 3:
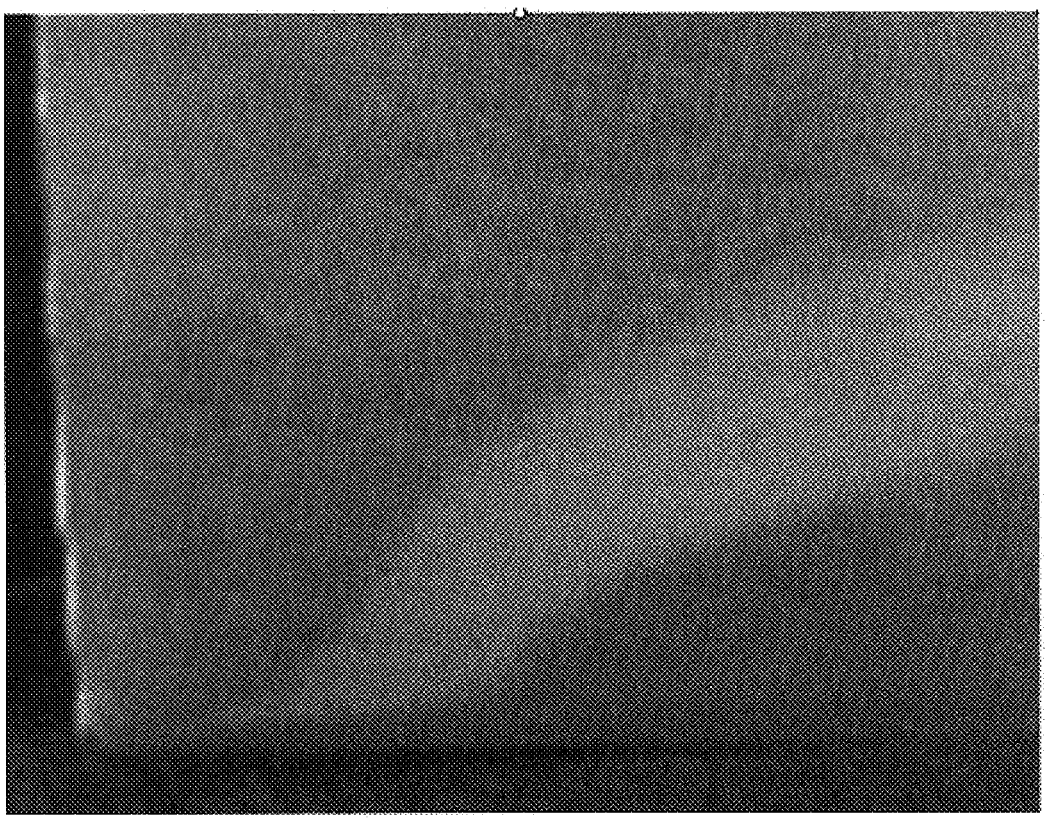
FIGS. 3 and 4 are photographs showing the surface of an aluminum sheet untreated with the aqueous inorganic expandable refractory composition of the present invention, before and after the aluminum sheet was burnt, respectively.
Figure 4:
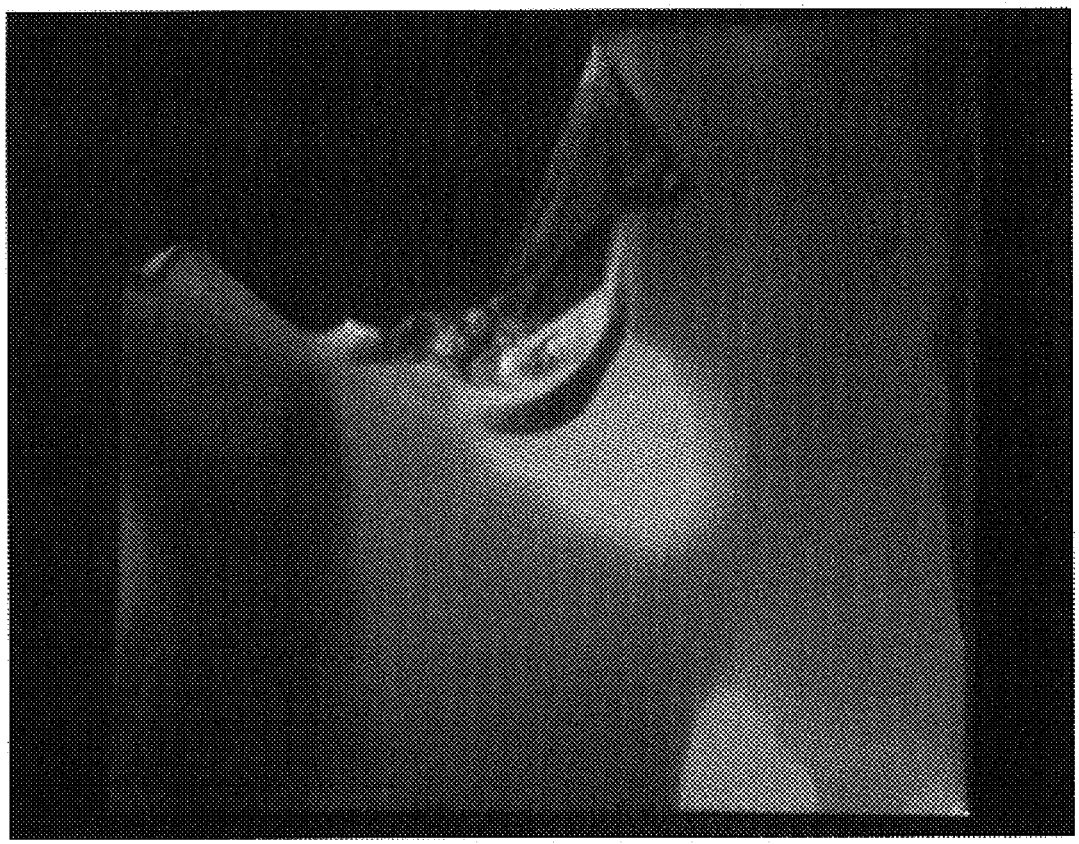

On the other hand, FIGS. 3 and 4 are photographs showing the surface of an aluminum sheet untreated with the aqueous inorganic expandable refractory composition of the present invention, before and after the fiber sludge was burnt, respectively. As can be seen in FIGS. 3 and 4, the aluminum plate started to melt and the shape thereof was greatly changed.

EXAMPLE 6

Manufacture of Refractory Board, and Refractory Test 5

The aqueous inorganic expandable board prepared in Example 1 was applied on both surfaces of a 38-mm-thick honeycomb paper structure to a thickness of 0.5 mm and dried, thus manufacturing a refractory board having a thickness of 2.5 mm. Furthermore, the refractory board was stacked in three layers on one side of a substrate and stacked in two layers on the other surface, thus manufacturing a refractory panel.

One surface of the refractory panel was heated to 1190° C., and changes in the temperature and shape of the heated surface and the back surface opposite to the heated surface were observed. The observation results are shown in Table 3 below.

TABLE 3

| Time | Temperature (° C.) of heated surface | Temperature (° C.) of back surface | Shape |
| --- | --- | --- | --- |
| 5 min | 800 | Room temperature | Smoke occurred; heated surface was expanded; smoke occurred for about 2–3 min and then ceased |
| 30 min | 1000 | 30 | No change |
| 60 min | 1100 | 35 | No change |
| 90 min | 1150 | 35 | Heated surface was slightly melted |
| 120 min | 1190 | 35 | Cracks occurred in expanded layer; second layer generated some smoke with burning. |
| 150 min | 1190 | 35 | Cracks in burnt surface became larger |
| 180 min | 1190 | 36 | Cracks were melted |

Figure 5:
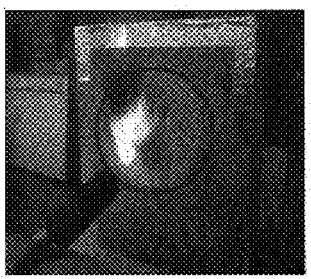
FIG. 5 shows a change in the heated surface of honeycomb paper having the inventive inorganic expandable refractory composition applied on both sides thereof, with the passage of heating time.
Figure 5:
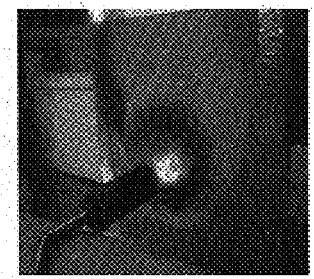
Figure 5:
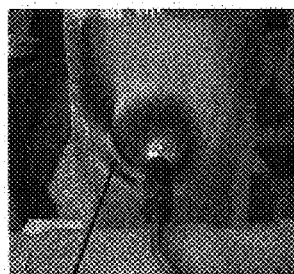
Figure 5:
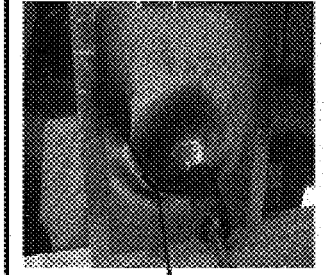
Figure 5:
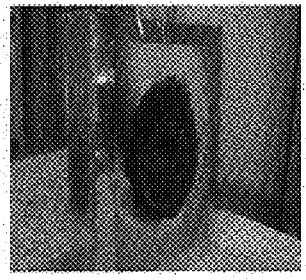
Figure 5:
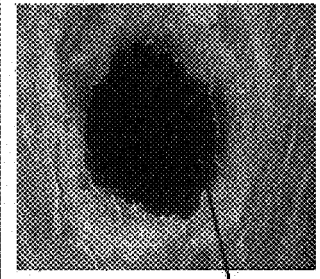

As shown in Table 3 and FIG. 5, in the case where the refractory composition was applied on both sides of the honeycomb paper structure, the heated surface was expanded just after heating, and the shape thereof was continuously maintained. After 2 hours of heating, the heated surface was partially burnt, but the shape of the honeycomb paper was maintained.

In particular, in the case of the back surface of the refractory panel, no change in temperature and change could be observed.

EXAMPLE 7

Manufacture of Refractory Board and Refractory Test 6

The aqueous inorganic expandable refractory composition was applied on both sides of a mixed sheet and dried, thus manufacturing a 10-mm-thick refractory board. Furthermore, the refractory board was stacked in three layers on both sides of a substrate, thus manufacturing a refractory panel.

Figure 6:
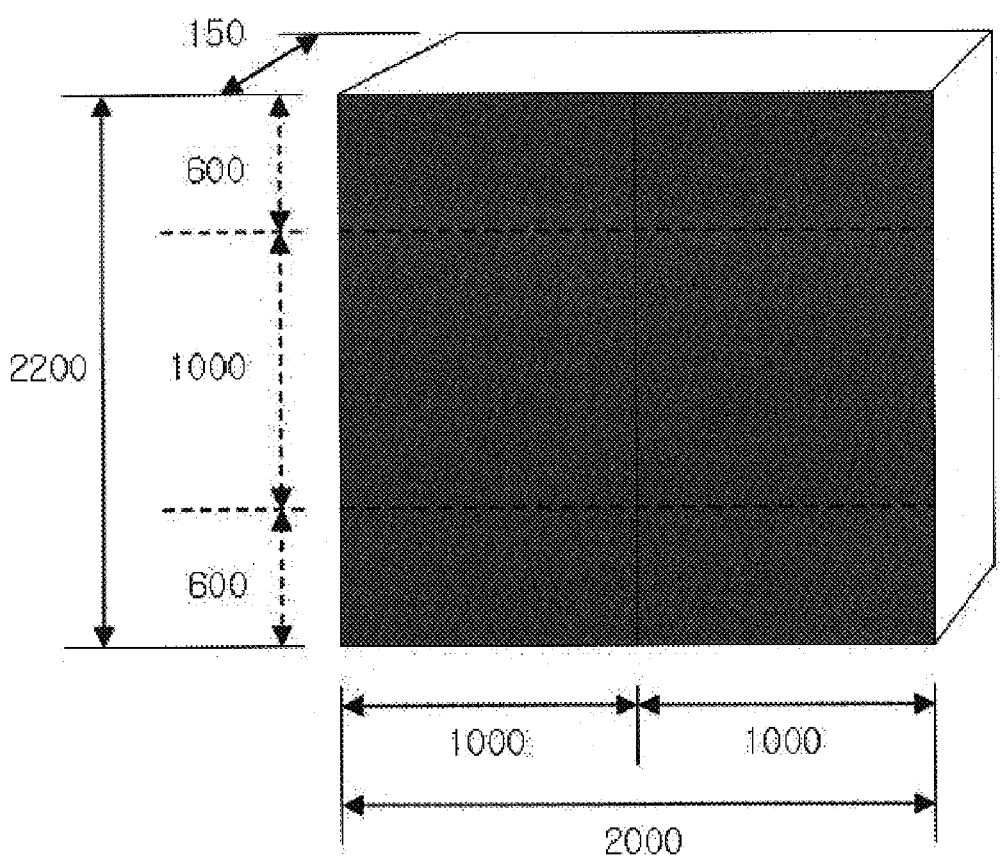
FIG. 6 is a front view of a structure in which refractory boards of the present invention are arranged in a lattice shape.
Figure 7:
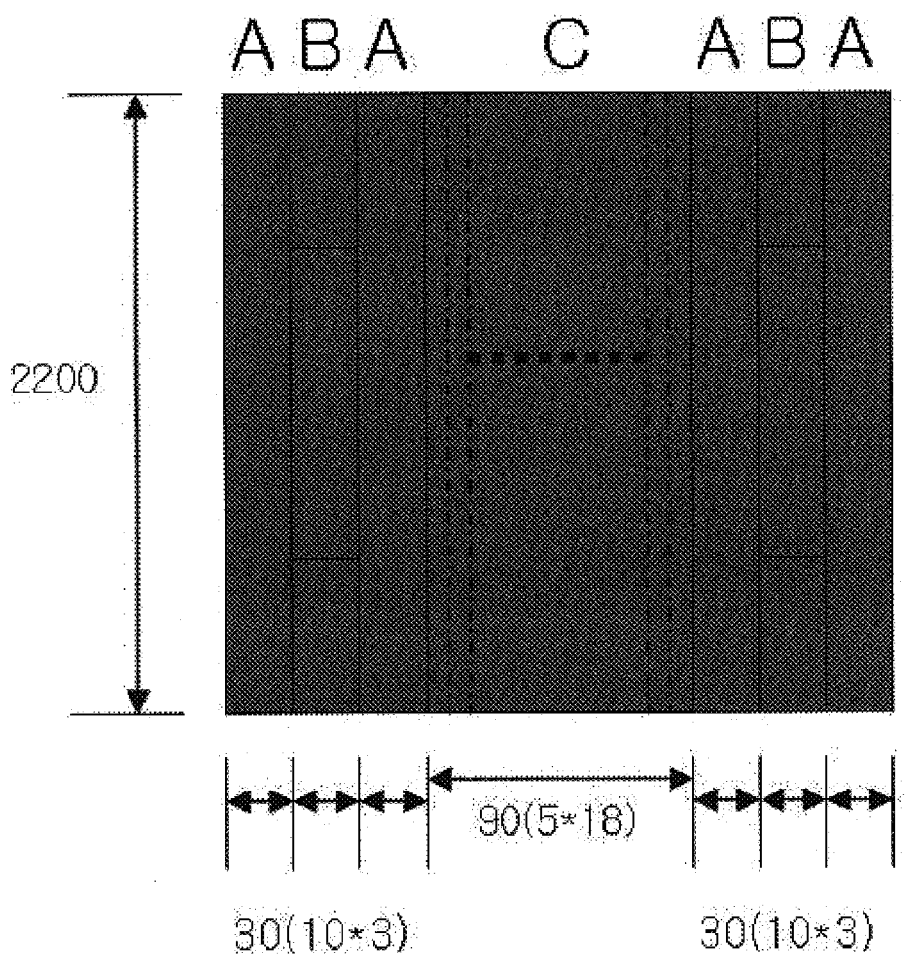
FIG. 7 is the side view of FIG. 6.

Herein, to prevent a fire source from penetrating into gap, the refractory board was arranged in a lattice shape as shown in FIGS. 6 and 7, and the manufactured refractory panel had a size of 2,000 mm×2,200 mm×150 mm. Furthermore, a partition wall was manufactured by fixing the refractory panel to an iron frame, which serves as a support for preventing the test sample from being detached due to the melting and expansion phenomena occurring when heating is continued.

Then, the partition wall was placed in a heating furnace, in which it was then heated at 1200° C. for 2 hours. The temperatures of eight sites on the non-heated surface of the partition wall were measured and, as a result, all the eight sites did not exceed 147° C.

As a result, it was seen that the heat of the heated surface was not transferred to the non-heated back surface of the partition wall, and the temperature of the back surface was maintained at the same temperature as that of the laboratory. After 2 hours of the heating, the refractory structure remained normal. Thus, a test was additionally conducted for 1 hour in the same manner as described above, and the test results were the same as those of the previous test.

The refractory test results for the partition wall are shown in Table 4 below.

maintained. In particular, in the other surface (non-heated surface) of the refractory panel, no change in temperature and shape could be observed, suggesting that the refractory composition of the present invention had excellent refractory properties.

EXAMPLE 8

Analysis of Harmful Components

On the refractory board used in Example 7, the analysis of harmful components was carried out in the following manner.

First, to analyze lead, cadmium, mercury and chromium, the refractory board was ground at low temperature to provide a sample. 0.3 g of the sample was immersed in an acid mixture of nitric acid, hydrochloric acid and 30% pure hydrogen peroxide, and the solution was heated in a microwave oven. Then, the heated solution was cooled, filtered and centrifuged. The supernatant was removed, and the precipitate was diluted, and analyzed with respect to the contents of the above components using an Inductively Coupled Plasma Emission Spectrophotometer (ICP) or an Atomic Absorption Spectrophotometer (AAS).

In particular, to analyze chromium (VI), 2-3 g of the sample obtained by grinding the refractory board at low temperature was added to an alkaline solution to dissolve water-soluble and water-insoluble chromium (VI). The pH of the solution was carefully adjusted and chromium (VI) in the solution was allowed to react with diphenylcarbazide. Then, chromium (VI) in the solution was quantified using an UV

TABLE 4

| Test item | | Performance standards | | Measurement results | | Refractory performance |
|---|---|---|---|---|---|---|
| Refractory test | Flame blocking properties | Cracks should not be observed | | Not observed | 180 min | 180 min |
| | | Cotton pad should not catch fire | | Not caught fire | | |
| | | Flame should not be generated (more than 10 sec) | | Not generated | | |
| | Heat blocking properties | Initial mean temperature | 7° C. | — | | |
| | | Mean temperature of non-heated surface | 147° C. | 12° C. | 180 min | |
| | | Highest temperature of non-heated surface | 187° C. | 88° C. | 180 min | |
| | | Heat transfer zone | | — | — | |

As a result, when the refractory board according to the present invention and the refractory panel manufactured by stacking the refractory board were applied either to any one inflammable material selected from among synthetic fiber, natural fiber, paper and wood or to iron materials and were tested at a temperature condition of 1000-1200° C., the following results are shown. After the expansion phenomenon occurred at the initial heating stage, burning was suppressed so that the surface shape was maintained. Also, the heated surface was only partially burnt, and the shape of the core was spectrophotometer or ion chromatography equipped with a colormetric detector.

Also, to measure the content of harmful bromine components (e.g., polybrominated biphenol (PBB) and polybrominated diphenyl ether (PBDE)) present in plastics, 0.1 g of the sample obtained by grinding the refractory board at low temperature was sufficiently dissolved in a Soxhlet containing a solvent for dissolving PBB and PBDE, and then was analyzed using gas chromatography-mass spectroscopy (GC-MS). The analysis results are shown in Table 5 below.

TABLE 5

| Analyzed components | Concentration (ppm or mg/Kg) | | | | | |
|---|---|---|---|---|---|---|
| | Lead | Cadmium | Mercury | Chromium (VI) | PBB | PBDE |
| Minimum detection limit | <10 | <5 | <5 | <5 | <20 | <20 |
| Example 7 | Not detected | Not detected | Not detected | Not detected | Not detected | Not detected |

As can be seen in Table 5, in the refractory panel comprising the aqueous inorganic expandable refractory composition, harmful heavy metals such as lead, chromium (VI), mercury and cadmium were detected at a level lower than the minimum detection limit of the device or were not detected. Furthermore, harmful brome compounds present in plastics were also not detected. Thus, the present invention can provide an eco-friendly inorganic refractory composition, a refractory board formed by applying the composition on a substrate, and a refractory panel formed by stacking the refractory board in at least two layers.

As described above, the present invention provides the inorganic expandable refractory composition, which contains, in addition to the aqueous flame-retardant composition, the aluminum hydroxide silicate mineral having a layered structure. When the composition is heated, closed pores will be formed in the composition due to carbon dioxide resulting from the self-decomposition of the phosphorus-based flame retardant. Thus, the refractory composition has significantly excellent refractory properties.

Also, the aqueous inorganic expandable refractory composition of the present invention comprises the metal oxides and the aluminum hydroxide silicate mineral, which are easily available and are inexpensive. Thus, the inventive refractory composition is cost-effective and, at the same time, environmentally friendly.

In addition, the present invention provides the refractory board, which is manufactured by applying the aqueous inorganic expandable refractory composition either to any one inflammable material selected from the group consisting of natural fiber, synthetic fiber, paper and wood or to a substrate selected from among iron materials. When one surface of this refractory board is heated, it is expanded just after heating while the burning thereof is suppressed. Also, the back surface opposite to the heated surface shows no change in the temperature and shape thereof. Thus, the refractory board has excellent refractory properties.

Furthermore, the present invention provides a fireproof paint, which is formed by being mixed with pigments and the aqueous inorganic expandable refractory composition.

Although the preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An aqueous inorganic expandable refractory composition comprising:
    1-3 wt % of a phosphorus-based flame retardant containing a carboxylic acid derivative represented by Formula 1;

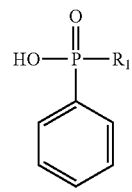

[Formula 1]

15-20 wt % of a first metal oxide;
48-65 wt % of a second metal oxide containing silicon dioxide;
10-20 wt % of an aluminum hydroxide silicate mineral having a highly expandable layered structure, said aluminum hydroxide silicate mineral being a refractory material having an expansion capability of at least 500 times; and
the balance of said composition being water;
wherein the aluminum hydroxide silicate mineral consists of 62.0-68.0 wt % of $SiO_2$, 18.0-23.0 wt % of $Al_2O_3$, 1.3-2.5 wt % of $Fe_2O_3$, 0.1-1.9 wt % of MgO, 0.05-1.5 wt % of $Na_2O$, 5.0-8.0 wt % of $K_2O$, and the balance of said aluminum hydroxide silicate mineral being at least one element selected from the group consisting of S, P, Pb, As and Hg;
wherein $R_1$ represents —$CH_2COOH$, —$CH_2CH_2COOH$ or —COCH.

2. The aqueous inorganic expandable refractory composition of claim 1, wherein the aluminum hydroxide silicate mineral has a particle size of 0.001-0.005 mm.

3. A refractory board formed by impregnating or applying the aqueous inorganic expandable refractory composition of claim 1, into, or to one or both sides of, an inflammable material selected from the group consisting of natural fiber, synthetic fiber, paper and wood, or a substrate selected from iron materials, and then drying the impregnated or applied composition.

4. The refractory board of claim 3, wherein the refractory board has a thickness of 0.3-1.5 mm.

5. A fireproof paint formed by being mixed with pigments and the aqueous inorganic expandable refractory composition of claim 1.

6. A method of making a refractory board comprising the steps of:
    impregnating or applying the aqueous inorganic expandable refractory composition of claim 1, into, or to one or both sides of, an inflammable material selected from the group consisting of natural fiber, synthetic fiber, paper and wood, or a substrate selected from iron materials; and
    drying the impregnated or applied composition.

* * * * *